United States Patent
Li et al.

(10) Patent No.: US 10,142,509 B2
(45) Date of Patent: Nov. 27, 2018

(54) SCANNING DEVICE PROVIDING EVEN SETS OF DATA FOR TYPESETTING AND OUTPUTTING AND IMAGE FORMING SYSTEM USING SUCH SCANNING DEVICE

(71) Applicant: AVISION INC., Hsinchu (TW)

(72) Inventors: Chen-Chang Li, Miaoli County (TW); Shao-Lan Sheng, Hsinchu (TW)

(73) Assignee: Avision Inc. (TW)

( * ) Notice: Subject to any disclaimer, the term of this patent is extended or adjusted under 35 U.S.C. 154(b) by 73 days.

(21) Appl. No.: 15/397,033

(22) Filed: Jan. 3, 2017

(65) Prior Publication Data
US 2017/0195510 A1   Jul. 6, 2017

(30) Foreign Application Priority Data
Jan. 6, 2016 (TW) .............................. 105100242 A

(51) Int. Cl.
| | |
|---|---|
| H04N 1/00 | (2006.01) |
| H04N 1/04 | (2006.01) |
| G06F 15/00 | (2006.01) |
| G06F 3/13 | (2006.01) |
| G06K 1/00 | (2006.01) |

(52) U.S. Cl.
CPC ......... *H04N 1/0464* (2013.01); *H04N 1/0057* (2013.01); *H04N 2201/0081* (2013.01); *H04N 2201/0094* (2013.01)

(58) Field of Classification Search
CPC ............... H04N 1/0464; H04N 1/0057; H04N 2201/0081; H04N 2201/0094

USPC .................... 358/1.1, 1.15, 408, 1.6, 1.7, 1.8
See application file for complete search history.

(56) References Cited

U.S. PATENT DOCUMENTS

| | | | |
|---|---|---|---|
| 2004/0015624 A1 | 1/2004 | Shih et al. | |
| 2008/0068682 A1* | 3/2008 | Morikawa | H04N 1/00002 358/521 |
| 2015/0237232 A1 | 8/2015 | Sheng et al. | |
| 2015/0304514 A1* | 10/2015 | Sheng | H04N 1/2032 358/1.6 |

FOREIGN PATENT DOCUMENTS

| | | |
|---|---|---|
| TW | I2452026 | 12/2005 |
| TW | M381972 | 6/2010 |
| TW | 201532851 | 9/2015 |

* cited by examiner

*Primary Examiner* — Douglas Tran

(57) ABSTRACT

A scanning device comprises a scan assembly, a control processor and an output interface. The scan assembly comprises two scanner modules for scanning front and reverse sides of a data medium to obtain front side analog data and reverse side analog data. The control processor electrically connected to the scan assembly controls the scan assembly, and executes an analog-to-digital converting process to convert the front side analog data and the reverse side analog data into front side digital data and reverse side digital data. The output interface electrically connected to the control processor outputs even sets of digital data, comprising the front side digital data and the reverse side digital data, to an image forming apparatus, so that the image forming apparatus performs even-set data typesetting and outputting after the even sets of digital data are completely outputted. An image forming system using the scanning device is also disclosed.

15 Claims, 4 Drawing Sheets

SCANNING DEVICE PROVIDING EVEN SETS OF DATA FOR TYPESETTING AND OUTPUTTING AND IMAGE FORMING SYSTEM USING SUCH SCANNING DEVICE

BACKGROUND OF THE INVENTION

This application claims priority of No. 105100242 filed in Taiwan R.O.C. on Jan. 6, 2016 under 35 U.S.C. 119, the entire content of which is hereby incorporated by reference.

Field of the Invention

This disclosure relates to a scanning device and an image forming system using the same, and more particularly to a scanning device capable of providing even sets of data for an image forming apparatus to perform typesetting and outputting, and an image forming system using such scanning device.

Description of the Related Art

When a conventional multi-function peripheral is scanning a small hard document, such as a certificate, a business card or the like, a transporting mechanism thereof cannot be used. Thus, the user must manually turn over the document while executing a flatbed scan function, and the convenience in use is significantly deteriorated. More particularly, when the flatbed scan function is executed, it is also a great challenge to the user to decide a reference position of the small hard document. The user who is unfamiliar with this peripheral usually needs to try many errors and find the solution.

For example, the user firstly places a front side of the certificate on a scan platen, and then the first copy is performed to generate a first reproduced document. If the user wants to copy the front side and the reverse side of the certificate on the same surface, then the user must place the first reproduced document on the manual supply tray, turn over the certificate, shift the placement position by a distance, and then perform the second copy to generate a second reproduced document. If the user wants to copy the front side and the reverse side of the certificate on the front and reverse sides of the reproduced document, then the user must place the first reproduced document on the manual supply tray, turn over the certificate, align the placement position with the original position, and then perform the second copy to generate the second reproduced document. These two operation modes may bring confusion and inconvenience to the user, so that the user is not willing to use the copy function for the certificate.

There are also simple certificate scanners available in the market. However, the typical certificate scanner is only used to scan the front and reverse sides of the certificate, and the user must arrange the scanned images on the personal computer to obtain an arranged image, and then transmit the arranged image to the copier for printing out. This is very time-consuming and inconvenient to the user, and especially to the process in which the certificate processing is required.

SUMMARY OF THE INVENTION

It is therefore an object of this disclosure to provide a scanning device capable of providing even sets of data for an image forming apparatus to perform typesetting and outputting, and an image forming system using the scanning device to bring convenience of certificate copying for the user.

To achieve the above-identified object, a scanning device performing a duplex scan on a data medium is provided. The scanning device comprises a scan assembly, a control processor and an output interface. The scan assembly comprises two scanner modules disposed in parallel to define a passage between the scanner modules. The two scanner modules scan a front side and a reverse side of the data medium to obtain front side analog data and reverse side analog data. The control processor is electrically connected to the scan assembly, controls the scan assembly and executes an analog-to-digital converting process to convert the front side analog data and the reverse side analog data into front side digital data and reverse side digital data. The output interface is electrically connected to the control processor, and outputs even sets of digital data, comprising the front side digital data and the reverse side digital data, to an image forming apparatus, so that the image forming apparatus performs even-set data typesetting and outputting after the even sets of digital data are completely outputted.

This disclosure further provides an image forming system comprising a scanning device and an image forming apparatus. The scanning device performs a duplex scan on a data medium and comprises a scan assembly, a control processor and an output interface. The scan assembly comprises two scanner modules disposed in parallel to define a passage between the two scanner modules. The two scanner modules scan a front side and a reverse side of the data medium to obtain front side analog data and reverse side analog data. The control processor is electrically connected to the scan assembly to control the scan assembly to operate, and executes an analog-to-digital converting process to convert the front side analog data and the reverse side analog data into front side digital data and reverse side digital data. The output interface is electrically connected to the control processor and the image forming apparatus. The output interface outputs even sets of digital data, comprising the front side digital data and the reverse side digital data, to the image forming apparatus for typesetting and outputting. The image forming apparatus provides a typesetting selecting interface after detecting that the output interface is successfully electrically connected to the image forming apparatus, and performs typesetting on the front side digital data and the reverse side digital data to generate a layout according to a predetermined value or a predefined value of the typesetting selecting interface. When the scanning device completely outputs the even sets of digital data, or when the layout of the image forming apparatus is full, the image forming apparatus processes the layout into final data for output.

With the above-mentioned aspects, the image forming apparatus may have the expanded function using the externally connected scanning device to bring the convenience in certificate copying for the user. The user who frequently needs to copy the certificates can carry one scanning device to work in conjunction with various multi-function peripherals (image forming apparatuses) to achieve the rapid typesetting and copying functions for the certificate, and the ordered typesetting function of multiple certificates.

Further scope of the applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

DETAILED DESCRIPTION OF THE INVENTION

Figure 1:
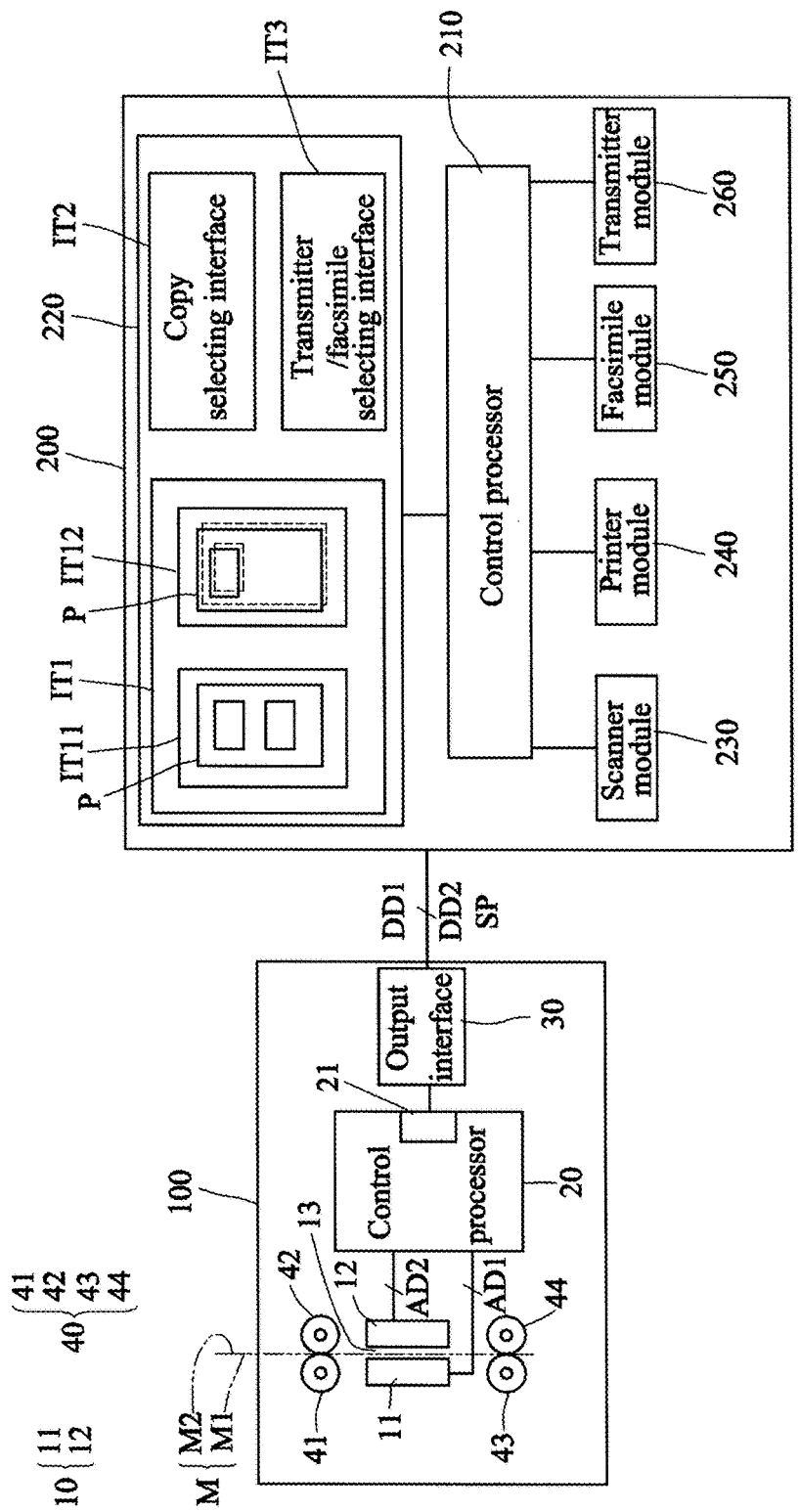
FIG. 1 is a schematic block diagram showing an image forming system according to a preferred embodiment of this disclosure.

FIG. 1 is a schematic block diagram showing an image forming system according to a preferred embodiment of this disclosure. Referring to FIG. 1, the image forming system of this embodiment comprises a scanning device 100 and an image forming apparatus 200. The scanning device 100 performs a duplex scan on a data medium M (scans both sides of the data medium M), and comprises a scan assembly 10, a control processor 20 and an output interface 30. In one example, the size of the data medium M meets the international standards of the ISO 7810 identity card, the bank card and the like, and may have one of four specifications of ID-1 (85.60×53.98 millimeters), ID-2 (105×74 millimeters), ID-3 (125×88 millimeters) and ID-000 (25×15 millimeters), wherein detailed descriptions thereof will be omitted.

The scan assembly 10 comprises two scanner modules 11 and 12 disposed in parallel to define (or form) a passage 13 between the two scanner modules 11 and 12. The two scanner modules 11 and 12 scan a front side M1 and a reverse side M2 of the data medium M to obtain front side analog data AD1 and reverse side analog data AD2. In this embodiment, a contact image sensor (CIS) scanner module advantageously having the small size and the low power consumption is described as an example. In another embodiment, however, scanner modules using charge-coupled device (CCD) image sensors are adopted.

The control processor 20 electrically connected to the scan assembly 10 controls the scan assembly 10 to operate, and executes an analog-to-digital converting process, to convert the front side analog data AD1 and the reverse side analog data AD2 into front side digital data DD1 and reverse side digital data DD2. The output interface 30 is electrically connected to the control processor 20. In this embodiment, the output interface 30 has a universal serial bus (USB) interface. In another embodiment, the output interface 30 is a wireless transmission interface signal-connected to the image forming apparatus 200 by way of wireless transmission. The control processor 20 communicates with the image forming apparatus 200 through the output interface 30. For example, the control processor 20 may output the parameters including the identification number, the maximum scan width or the like, or even transmit the driver for the scanning device 100 to the image forming apparatus 200 so that the scanning device 100 is applicable to different brand models of image forming apparatuses, or to a computer.

In one example, the scan range of the scanning device 100 is smaller than or equal to ¼ of the maximum range, which can be processed by the image forming apparatus 200. If the maximum range, which can be processed by the image forming apparatus 200, is the A3 size, then the scan range of the scanning device 100 is smaller than or equal to the A5 size. The advantage of this configuration is that the image forming apparatus 200 only needs to rotate the images of the even sets of digital data by 90 degrees (or no rotation is made), and the simple typesetting (or arrangement) without cropping or other complicated computations can be performed to print out the front and reverse sides of two certificates. In one example, the scan range of the scanning device 100 is smaller than or equal to ½ of the maximum range, which can be processed by the image forming apparatus 200. If the maximum range, which can be processed by the image forming apparatus 200, is the A4 size, then the scan range of the scanning device 100 is smaller than or equal to the A5 size. The advantage of this configuration is that the image forming apparatus 200 only needs to rotate the images of the even sets of digital data by 90 degrees (or no rotation is made), and the simple typesetting without cropping or other complicated computations can be performed to print out the front and reverse sides of one single certificate. This meets the requirements of the ordinary user. The dimensional relationship can be obtained by the transmission of the above-mentioned parameters.

In addition, the scanning device 100 may further comprise a transporting mechanism 40 for transporting the data medium M past the scanner modules 11 and 12 along the passage 13. The control processor 20 electrically connected to the transporting mechanism 40 controls the transporting mechanism 40 to operate. In this embodiment, the transporting mechanism 40 comprises four rollers 41, 42, 43 and 44, which define a plane and non-curved passage 13 so that the certificate can be transported straightly forward.

In this non-limitative example, the image forming apparatus 200 is a multi-function peripheral comprising a control processor 210, and a man-machine interface 220, a scanner module 230, a printer module 240, a facsimile module 250 and a transmitter module 260, which are electrically connected to the control processor 210. The image forming apparatus 200 is electrically connected to the output interface 30. The output interface 30 outputs the front side digital data DD1 and the reverse side digital data DD2 to the image forming apparatus 200 for typesetting and outputting. The image forming apparatus 200 detects that the output interface 30 is successfully electrically connected to the image forming apparatus 200, and then provides a typesetting selecting interface IT1, and performs typesetting to arrange the front side digital data DD1 and the reverse side digital data DD2 to form a layout P according to a predetermined value (preset in the image forming apparatus 200) or a predefined value (the user sets the value through the man-machine interface 220 of the image forming apparatus 200) of the typesetting selecting interface IT1. It is worth noting that the predetermined value may be generated according to the parameters outputted from the control processor 20 so that the intelligent setting can be executed. That is, the control processor 20 further outputs the scan parameters SP to the image forming apparatus 200 through the output interface 30, wherein the scan parameters SP correspond to the working parameters of the scanner modules 11 and 12 and the working parameters of the transporting mechanism 40, and the image forming apparatus 200 further generates the typesetting selecting interface IT1 according to the scan parameters SP. In another example, the image forming apparatus may be a printer without scanner, facsimile and/or transmitter modules or module.

In one example, after the scanning device 100 completely outputs the even sets of digital data (i.e., when the buffer 21 of the control processor 20 has no data content or all data contents have been marked with "completely transmitted"), the image forming apparatus 200 processes the layout P into final data for output. In another example, when the layout P in the image forming apparatus 200 is full (no further scanned image can be added), the image forming apparatus 200 processes the layout P into final data for output.

Furthermore, the output interface 30 receives the power from the image forming apparatus 200 to drive the scan assembly 10, the transporting mechanism 40 and the control processor 20 of the scanning device 100 to prevent the externally-connected power from causing the messy wiring problem.

In order to confirm whether the scanner modules 11 and 12 can work normally or not, the control processor 20 firstly detects the workable states of the scanner modules 11 and 12 and the transporting mechanism 40 before outputting the working parameters, and the image forming apparatus 200 further generates the typesetting selecting interface IT1 according to the workable states. For example, when the control processor 20 detects that the workable state of one (only one) of the scanner modules 11 and 12 is disabled, the control processor 20 notifies the image forming apparatus 200 of the disabled workable state through the working parameters, and the image forming apparatus 200 shows the instruction information on the man-machine interface 220 to instruct the user to maintain the image forming apparatus 200. If the user still wants to perform the scan or copy process, then the image forming apparatus 200 can output an instruction signal to instruct the user to turn over or flip the data medium M once manually, so that the front side digital data DD1 and the reverse side digital data DD2 can be generated.

The final data can be processed in the following. The image forming apparatus 200 can utilize the printer module 240 to print the final data on a print medium, utilize the facsimile module 250 to facsimile the final data, utilize the transmitter module 260 to process the final data into an electric file (e.g., PDF file, JPG file or the like) and transfer the electric file out, or utilize a storage module (not shown) to store the electric file to an external storage device, such as a USB mobile disk, a memory card or the like. In another example, the image forming apparatus 200 can transfer the electric file back to the scanning device 100, so that the user can electrically connect the scanning device 100 to the computer. At this time, the scanning device 100 functions as an external storage device, and the computer can copy the electric file from the scanning device 100. This configuration is useful when the scanning device 100 and the image forming apparatus 200 are particularly paired and matched and the computer cannot be paired and matched with the scanning device 100.

Figure 4:
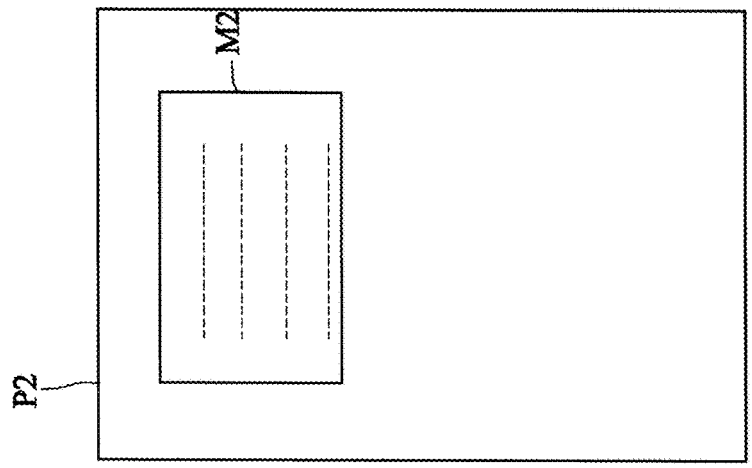
FIGS. 2 to 4 are schematic block diagrams showing multiple examples of typesetting layouts in the image forming system according to the preferred embodiment of this disclosure.
Figure 3:
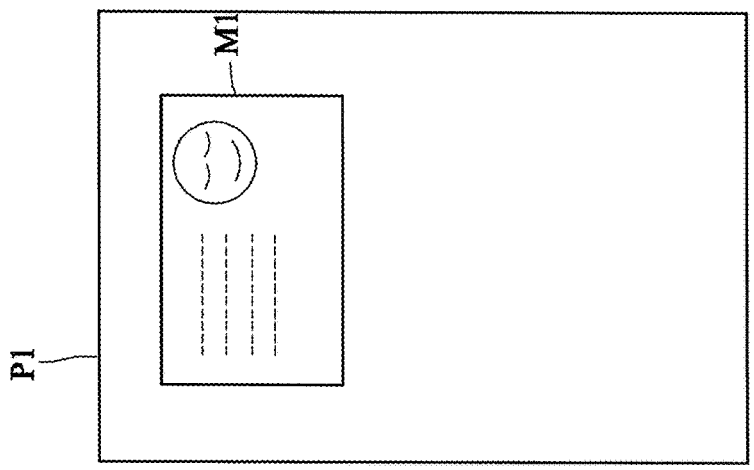
Figure 2:
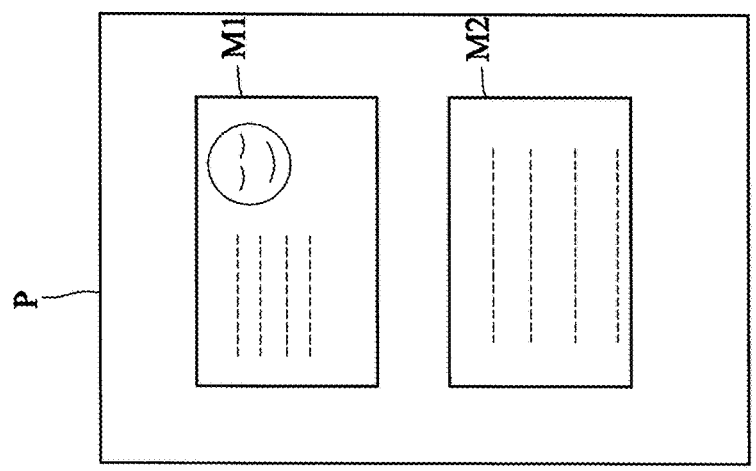

The above-mentioned typesetting selecting interface IT1 may be displayed on the man-machine interface 220, such as a touch screen, or an ordinary screen working in conjunction with function buttons. The typesetting selecting interface IT1 comprises a simplex print option IT11 and a duplex print option IT12. The details of the layout P of the simplex print option IT11 correspond to those of the layout P of FIG. 2, and represent that the images of the front side M1 and the reverse side M2 of the data medium M are printed on the same page of the same print medium. The layout P of the duplex print option IT12 comprises the layouts P1 and P2 of FIGS. 3 and 4, and represents that the images of the front side M1 and the reverse side M2 are printed on different pages of the same medium.

In this embodiment, in addition to the typesetting selecting interface IT1, a copy selecting interface IT2 and a transmitter/facsimile selecting interface IT3 are also shown.

In another embodiment, when the scanning device 100 is connected to the image forming apparatus 200, the image forming apparatus 200 only displays the typesetting selecting interface IT1, and closes other selecting interfaces (e.g., IT2 and IT3), which are presented when the image forming apparatus 200 is disconnected from the scanning device 100.

In one embodiment of this disclosure, because the scanning device 100 is dedicated to the certificate scanning, its scanning size can be selected to be constant, and the outputted data has the fixed size (pixel counts). The image forming apparatus 200 can determine the collected data amount, and when the data collecting ends according to the fixed size (pixel counts) of data, and enables the typesetting and printing operations immediately after the data collecting ends. In addition, after the image forming apparatus 200 confirms that the even sets of digital data have been received, the even-set data typesetting and outputting processes can be enabled, and this is very simple and convenient in the overall judgement logic.

Figure 5:
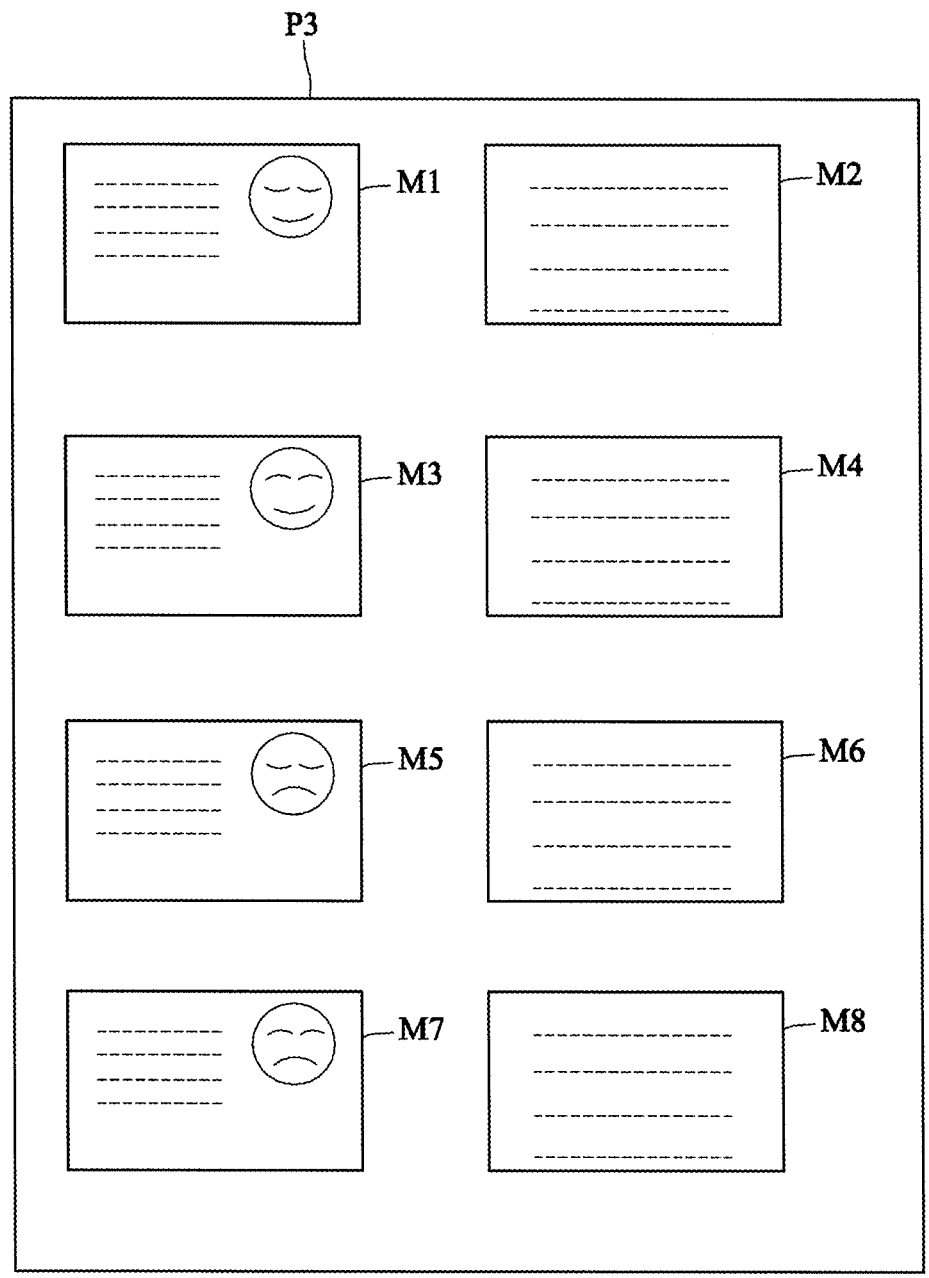
FIGS. 5 and 6 are schematic block diagrams showing two examples of multi-page ordered typesetting layouts in the image forming system according to the preferred embodiment of this disclosure.
Figure 6:
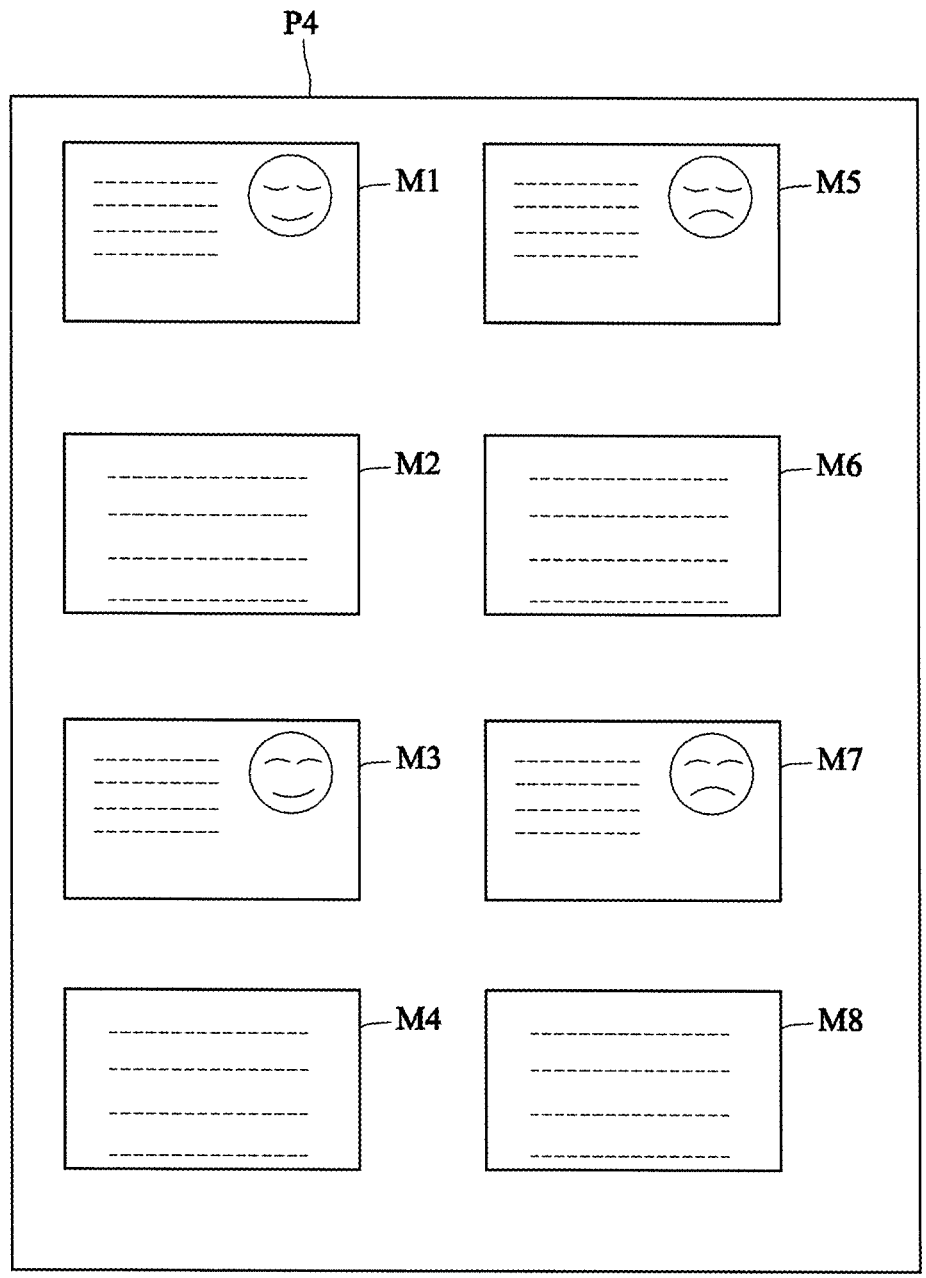

FIGS. 5 and 6 are schematic block diagrams showing two examples of multi-page ordered typesetting layouts in the image forming system according to the preferred embodiment of this disclosure. As shown in FIGS. 5 and 6, when multiple data media are scanned at a time, the two scanner modules 11 and 12 scan the data medium M and further scan the front sides and reverse sides of additional data media to obtain additional front side analog data and additional reverse side analog data. In this case, the control processor 20 converts the additional front side analog data and the additional reverse side analog data into additional front side digital data and additional reverse side digital data. All the front side digital data and reverse side digital data are transmitted to the image forming apparatus 200 in order. After receiving these digital data, the image forming apparatus 200 further performs typesetting on the front side digital data, the reverse side digital data, the additional front side digital data and the additional reverse side digital data to generate the layouts P3 and P4 according to a corresponding positional relationship between the two scanner modules. For example, the user usually places the certificate with its front side facing himself or herself to make sure who is the owner of this certificate. Thus, the scanner module closer to the user scans the front side of the certificate, and the scanner module away from the user scans the reverse side of the certificate, wherein the corresponding positional relationship of the scanner modules can be set before the scanning device is shipped out, and may also be set by the user. In FIG. 5, M1, M3 and M5 represent the front side; M2, M4, M6 and M8 represent the reverse side, and the typesetting order goes firstly from left to right and then from top to bottom. That is, all the obtained image data scanned by the scanner module 11 are placed on the left field of the layout P3. On the contrary, all the obtained image data scanned by the scanner module 12 are placed on the right field of the layout P3. In FIG. 6, the typesetting order goes firstly from top to bottom, and then from left to right. That is, all the obtained image data scanned by the scanner module 11 are placed on the odd row of the layout P4. On the contrary, all the obtained image data scanned by the scanner module 12 are placed on the even row of the layout P4. However, this disclosure is not restricted thereto. the typesetting form may have various variations, and when the typesetting exceeds the layout P3 or P4, the image forming apparatus 200 automatically generates a new layout for the typesetting.

With the above-mentioned embodiments, the image forming apparatus may have the expanded function using the externally connected scanning device to bring the convenience in certificate copying for the user. The user who frequently needs to copy the certificates can carry one scanning device to work in conjunction with various multi-function peripherals (image forming apparatuses) to achieve the rapid typesetting and copying functions for the certificate, and the ordered typesetting function of multiple certificates.

While the present disclosure has been described by way of examples and in terms of preferred embodiments, it is to be understood that the present disclosure is not limited thereto. To the contrary, it is intended to cover various modifications. Therefore, the scope of the appended claims should be accorded the broadest interpretation so as to encompass all such modifications.

What is claimed is:

1. A scanning device for performing a duplex scan on a data medium, the scanning device comprising:
    a scan assembly, comprising two scanner modules disposed in parallel to define a passage between the scanner modules, the two scanner modules scanning a front side and a reverse side of the data medium to obtain front side analog data and reverse side analog data;
    a control processor, which is electrically connected to the scan assembly, controls the scan assembly and executes an analog-to-digital converting process to convert the front side analog data and the reverse side analog data into front side digital data and reverse side digital data; and
    an output interface, which is electrically connected to the control processor, and outputs even sets of digital data, comprising the front side digital data and the reverse side digital data, to an image forming apparatus, so that the image forming apparatus performs even-set data typesetting and outputting after the even sets of digital data are completely outputted, wherein the image forming apparatus is a multi-function peripheral or a printer.

2. The scanning device according to claim 1, further comprising a transporting mechanism for transporting the data medium past the scanner modules along the passage, wherein the control processor is electrically connected to the transporting mechanism and controls the transporting mechanism to operate.

3. The scanning device according to claim 2, wherein the output interface receives a power from the image forming apparatus to drive the scan assembly, the transporting mechanism and the control processor of the scanning device.

4. The scanning device according to claim 2, wherein the control processor further outputs scan parameters to the image forming apparatus through the output interface, the scan parameters correspond to working parameters of the scanner modules and working parameters of the transporting mechanism.

5. The scanning device according to claim 4, wherein the control processor firstly detects workable states of the scanner modules and the transporting mechanism before the working parameters are outputted.

6. The scanning device according to claim 5, wherein when the control processor detects that the workable state of one of the scanner modules is disabled, the control processor notifies the image forming apparatus of the disabled workable state through the working parameters.

7. An image forming system, comprising:
    a scanning device performing a duplex scan on a data medium, the scanning device comprising:
        a scan assembly comprising two scanner modules disposed in parallel to define a passage between the two scanner modules, the two scanner modules scanning a front side and a reverse side of the data medium to obtain front side analog data and reverse side analog data;
        a control processor, which is electrically connected to the scan assembly to control the scan assembly to operate, and executes an analog-to-digital converting process to convert the front side analog data and the reverse side analog data into front side digital data and reverse side digital data; and
        an output interface electrically connected to the control processor; and
    an image forming apparatus electrically connected to the output interface, wherein the output interface outputs even sets of digital data, comprising the front side digital data and the reverse side digital data, to the image forming apparatus for typesetting and outputting, wherein the image forming apparatus provides a typesetting selecting interface after detecting that the output interface is successfully electrically connected to the image forming apparatus, and performs typesetting on the front side digital data and the reverse side digital data to generate a layout according to a predetermined value or a predefined value of the typesetting selecting interface, wherein when the scanning device completely outputs the even sets of digital data, or when the layout of the image forming apparatus is full, the image forming apparatus processes the layout into final data for output, wherein the image forming apparatus is a multi-function peripheral or a printer.

8. The image forming system according to claim 7, wherein the scanning device further comprises a transporting mechanism for transporting the data medium past the scanner modules along the passage, wherein the control processor is electrically connected to the transporting mechanism and controls the transporting mechanism to operate.

9. The image forming system according to claim 8, wherein the output interface receives a power from the image forming apparatus to drive the scan assembly, the transporting mechanism and the control processor of the scanning device.

10. The image forming system according to claim 8, wherein the control processor further outputs scan parameters to the image forming apparatus through the output interface, the scan parameters correspond to working parameters of the scanner modules and working parameters of the transporting mechanism, and the image forming apparatus further generates the typesetting selecting interface according to the scan parameters.

11. The image forming system according to claim 10, wherein the control processor firstly detects workable states of the scanner modules and the transporting mechanism before the working parameters are outputted, and the image forming apparatus further generates the typesetting selecting interface according to the workable states.

12. The image forming system according to claim 11, wherein when the control processor detects that the workable state of one of the scanner modules is disabled, the control processor notifies the image forming apparatus of the disabled workable state through the working parameters, and the image forming apparatus outputs an instruction signal to instruct a user to manually turn over the data medium once, so that the front side digital data and the reverse side digital data are generated.

13. The image forming system according to claim 7, wherein the image forming apparatus further prints the final data on a print medium.

14. The image forming system according to claim 7, wherein the typesetting selecting interface comprises a simplex print option and a duplex print option, and the image forming apparatus only displays the typesetting selecting interface, and closes other selecting interfaces presented when the image forming apparatus is disconnected from the scanning device.

15. The image forming system according to claim 7, wherein the two scanner modules further scan front sides and reverse sides of additional data media to obtain additional front side analog data and additional reverse side analog data, the control processor converts the additional front side analog data and the additional reverse side analog data into additional front side digital data and additional reverse side digital data, and the image forming apparatus further performs typesetting on the front side digital data, the reverse side digital data, the additional front side digital data and the additional reverse side digital data to generate the layout according to a corresponding positional relationship between the two scanner modules.

\* \* \* \* \*